United States Patent
Newman et al.

(10) Patent No.: US 6,725,714 B2
(45) Date of Patent: Apr. 27, 2004

(54) WATER PRESSURE PROBE SPEEDOMETER

(76) Inventors: James E. Newman, P.O. Box 905, Lake Ozark, MO (US) 65049; William E. Yelton, 76 State Rd. PP, Tunas, MO (US) 65764

( * ) Notice: Subject to any disclaimer, the term of this patent is extended or adjusted under 35 U.S.C. 154(b) by 0 days.

(21) Appl. No.: 10/288,759

(22) Filed: Nov. 6, 2002

(65) Prior Publication Data

US 2003/0084721 A1 May 8, 2003

Related U.S. Application Data

(60) Provisional application No. 60/337,456, filed on Nov. 8, 2001.

(51) Int. Cl.[7] .................................................. G01P 5/17
(52) U.S. Cl. ........................ 73/182; 73/861.65; 73/493; 73/488
(58) Field of Search .......................... 73/181–182, 488, 73/861.65–861.68; 362/23, 29, 30

(56) References Cited

U.S. PATENT DOCUMENTS

| | | | | |
|---|---|---|---|---|
| 4,070,909 A | * | 1/1978 | Carpenter | 73/182 |
| 4,271,700 A | * | 6/1981 | Tschanz et al. | 73/182 |
| 4,527,429 A | * | 7/1985 | Combest et al. | 73/744 |
| 4,528,846 A | * | 7/1985 | Irwin | 73/182 |
| 4,599,890 A | * | 7/1986 | Girone et al. | 73/37 |
| 4,611,488 A | * | 9/1986 | Weingart | 73/182 |
| 5,136,516 A | * | 8/1992 | Twombly | 701/20 |
| 5,786,538 A | * | 7/1998 | Barone | 73/714 |
| 5,945,591 A | * | 8/1999 | Saarem | 73/1.35 |

* cited by examiner

Primary Examiner—Hezron Williams
Assistant Examiner—John Hanley
(74) Attorney, Agent, or Firm—Mark Manley

(57) ABSTRACT

A boat mounted speedometer for providing a speed signal to a boat operator. The system includes a probe that reaches a laminar flow of water below the back edge of the boat. An opening in the probe allows for water pressure, proportional to boat speed to build up in the system. Any air trapped in the water in the system is bled out through a bleed valve. A pressure transducer reads out a signal and a processor generates a digital signal proportional to pressure and speed of the boat. The signal is read out for the operator on a back lit digital speedometer display.

12 Claims, 3 Drawing Sheets

WATER PRESSURE PROBE SPEEDOMETER

This application claims benefit of Provisional Application No. 60/337,456, filed Nov. 8, 2001.

BACKGROUND OF THE INVENTION

In the boating industry it is desirable to be able to measure the speed of a boat as it travels through water. Increasingly water patrols are regulating speed of boat traffic and yet for many boat operators there is no reliable way to measure speed. A number of prior art solutions have been developed to measure boat speed in water.

One common approach to measuring speed is to use a system with a small propeller or wheel that turns faster as the boat travels faster through the water. These systems are unreliable primarily because of debris in the water and problems associated with a system having moving parts exposed to the hydrodynamic forces that can be generated by boats traveling over 25 miles per hour in the water.

Another common approach to measure speed is to use a pressure sensing tube with an opening in the direction of boat travel. Static pressure builds up in the tube as the boat speed increases. The pressure is read out by a gauge or other device that converts the pressure into a visual display indicative of boat speed. One problem with these sensing tube devices has been air trapped in the tube which is used to transfer pressure. Pressurized air trapped in the tube of the speedometer will give erratic and false readings because of the compressibility of the trapped air. Another problem with these pressurized tubes is in the device used to read out a speed. Often times a needle gauge is placed on the end of the line. This is a simple arrangement but yields a device that is difficult to read and that is subject to vibration induced needle bounce and damage due to vibration present on a small boat. These sensing tube systems also have problems with the depth of the probe, which needs to be out of turbulent flow. There is also a problem with snagging debris such as sticks in the water which can break off the tube.

SUMMARY OF THE INVENTION

The present invention relates to a boat mounted speedometer that solves the problems of prior approaches. The current system provides an economical system that generates a quick, reliable readout of speed to a boat operator.

The present invention provides a water filled probe having the ability to automatically bleed off trapped air so as to provide a reliable speed signal at all times. Further the present system provides a probe that can flex out of the way of debris such as sticks and water plants. The system further provides a back lit digital display that gives an easily read indication of boat speed at all times including at night.

The present invention provides an easy to install automatic air bleed using a simple plastic float.

These and other advantages of the present invention will become apparent from the detailed description of the invention.

DETAILED DESCRIPTION OF THE DEVICE

Figure 1:
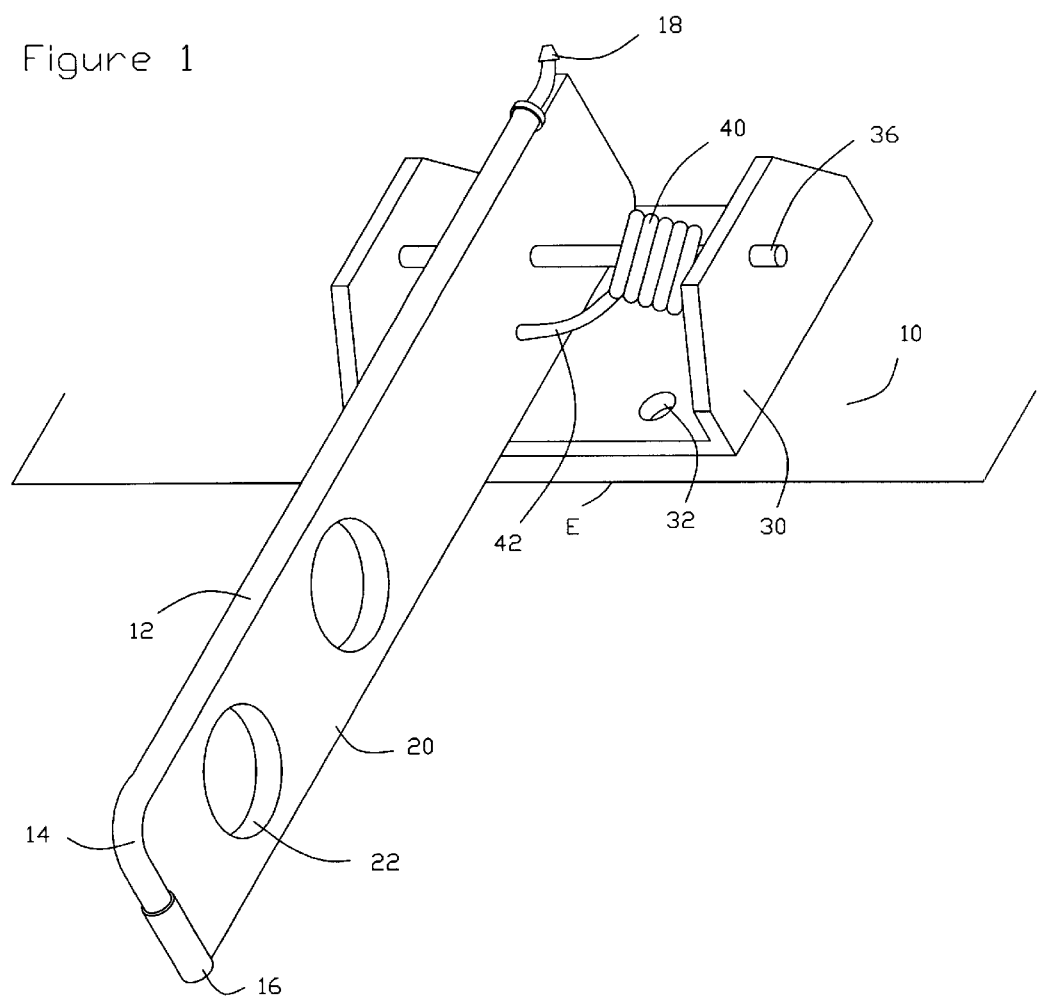
FIG. 1 shows an isometric view of the probe mounted on the back of a boat.

FIG. 1 shows an isometric view of the probe 10 mounted to the bottom edge 'E' of a boat. The probe 10 includes a tube 12 bent at a 90 degree angle 14. The tube has an opening 16 at an upstream end of the tube 12 and an outlet 18. The tube includes a support web 20 which can have openings 22 to reduce force on the probe 10 as the boat 'E' moves through the water.

The probe 10 includes a mounting bracket 30 to mount the probe 10 to the back edge of the boat 'E'. Holes 32 allow for screws or similar fasteners to be used. A pivot pin 36 supported by bracket 30 passes through a wound spring 40. The spring 40 includes an end leg 42 that attaches to the support web 20 and can provide a spring tension that normally maintains the tube 12 in the water. The tube can pivot out of the water if it hits on an obstruction such as a stick or weeds in the water. The outlet 18 is attached to a flexible line 110 which can be rubber for example, the line flexibility allows the tube 12 to pivot on pin 36.

Figure 2:
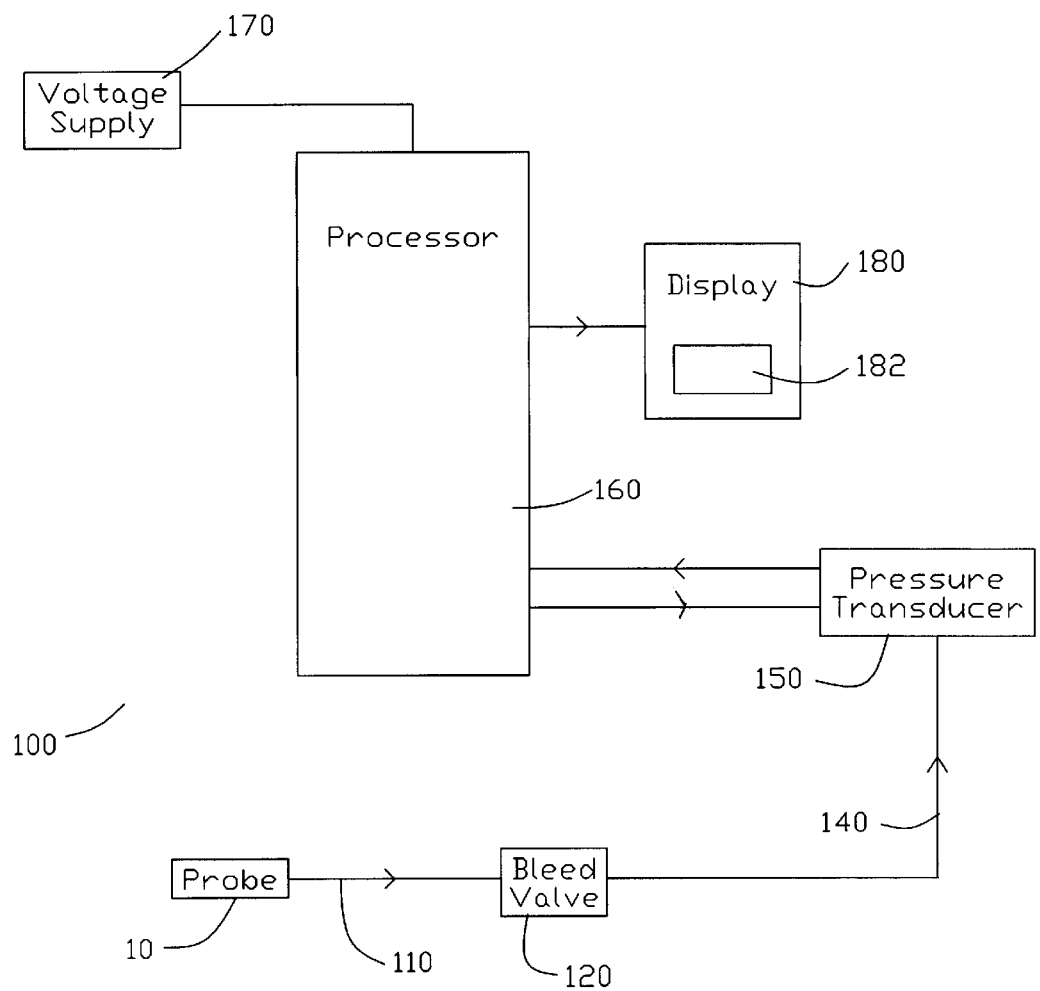
FIG. 2 shows a schematic of the speedometer control

FIG. 2 shows a schematic view of the control system 100 for the speedometer. The probe 10 provides a feed of pressurized water through outlet 18 (FIG. 1) to a flexible supply line 110. Water flows through the line 110 to a bleed valve 120 where air can be bled from the line 110. Water then pressurizes line 140 and the pressure transducer 150 detects the pressure. The pressure transducer 150 provides a signal proportional to pressure to a processor 160. The processor 160, powered by voltage supply 170 (which can be part of the boat voltage system), provides a signal proportional to the pressure to display 180 which can read out the boat speed to the operator in miles per hour (or any appropriate speed units) in back lit display 182.

Figure 3:
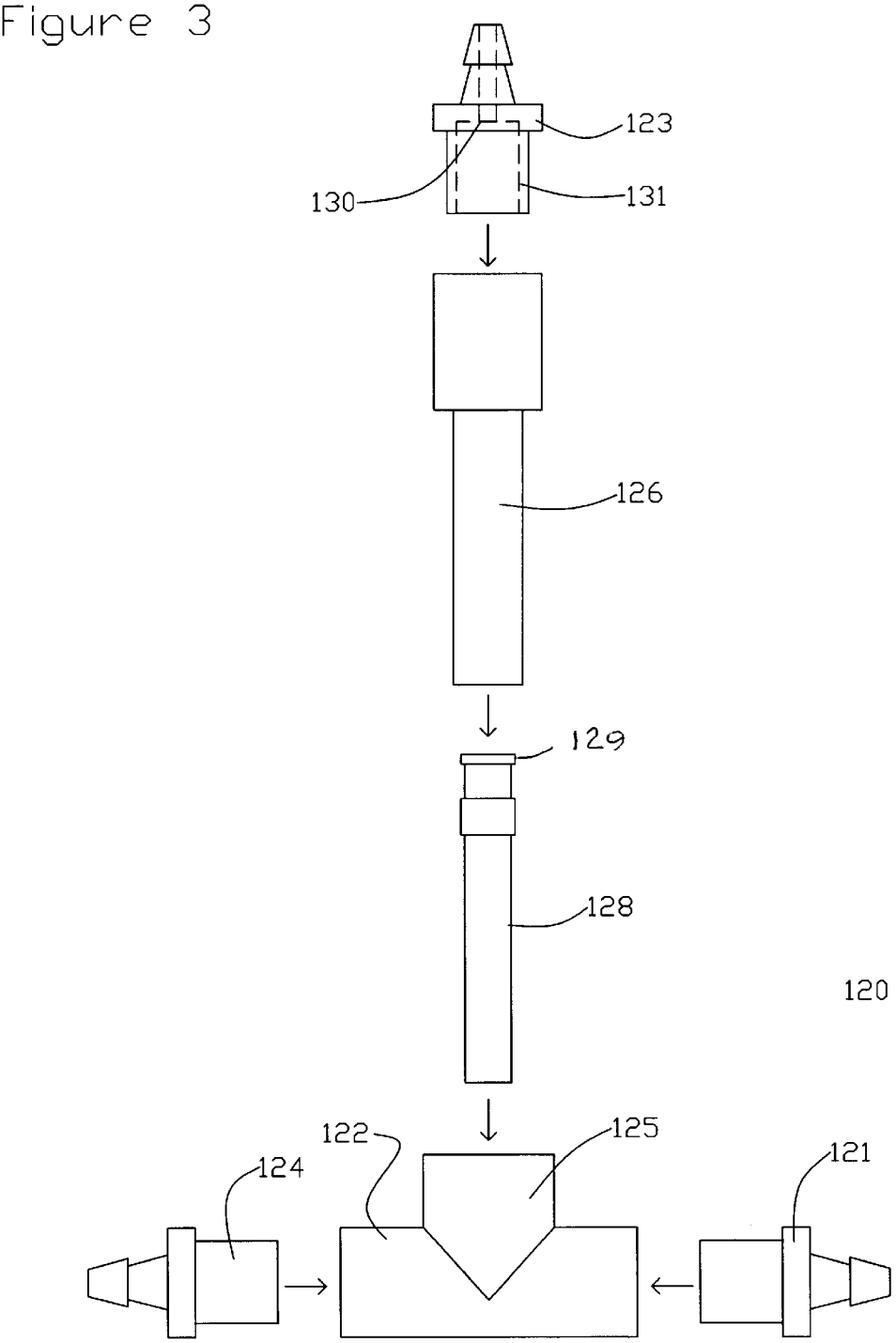
FIG. 3 shows an exploded view of the air bleed valve

FIG. 3 shows details of the bleed valve 120 in an exploded view. The valve 120 includes a valve body 122 and nipples 121, 123, 124 at the inlet and outlets of the valve body 122. The upper chamber 125 of the valve body 122 connects to a pipe extension 126. A free moving float 128 is located inside the pipe extension 126 and has a diameter smaller then the inside diameter of pipe extension 126. The float 128 can include a rubber tip 129 to improve its ability to seal. Once assembled water from the probe 10 will flow through nipple 121 through the valve body 122 and on through nipple 124. Experience has shown that pressurized water flowing in the valve body 122 will cause the float 128, which can have a specific gravity less than water, to float upward in the pipe extension 126 until it seats against the inside face 130 (shown in hidden lines 131) of the nipple 123. This seals off the flow through nipple 123 and water can then only statically raise or lower pressure in the water lines. Water will not move again in the system until the boat stops and the water flows back out of the system. The nipple 123 can be connected to a drain hose (not shown) to carry any small amount of leakage of water past float 128 back overboard.

In operation, and referring to all figures, The inlet 16 to probe 10 is located below the bottom edge of the boat 'E'. Ideally the inlet 16 is below any turbulence caused by non-laminar flow or other anomalies associated with the wake of the boat. During particular times such as winter, it is common to take small boats out of the water. Each time the boat stops or is placed back in the water, the water lines and tubes 12, 110, 122, 126, and 140 must be filled with water, which drains out when the boat is dry docked or trailered. As the boat begins to move and water flows into the probe tube 12 it automatically begins to force air out of the bleed valve 120, the float 128 will be in its lowest position separated from seat 130. Once all the air is bled, and pipe extension 126 fills with water, the float 128 will reach the seat 130 of nipple 123 and water will fill line 140. Any air trapped in the water in the system 100 is bled out through bleed valve 120. Pressure in the system 100 will tend to maintain the float 128 in the seated position. Once the tubes and lines are filled, water does not flow through the system 100. Rather as the boat speeds through the water, pressure is exerted on inlet 16 the pressure transfers through water in the connecting tubes and lines and is picked up by pressure transducer 150. Pressure transducer 150 generates a signal proportional to pressure to processor 160, which in turn generates a signal to drive electronic display 180. A speed readout will appear in display window 182.

Because water does not need to flow through the lines 12, 110, 122, 126 and 140 during most of the operation, the system 100 is much less vulnerable to debris getting into the lines. Further if the probe 10 encounters a larger object, such as a submerged log in the water, the spring 40 allows it to flex out of the way without being broken off. Once past the object the spring 40 will return the probe 10 to its proper orientation. The openings 22 in the web 20 reduce side pressure on the web created when the boat turns.

What is claimed is:

1. The method of measuring speed relative to water comprising the steps of:

locating a probe including a water line within the water;

connecting the water line of said probe to a pressure transducer with another water line;

filling the water lines with water;

bleeding air from said water lines;

generating an electronic signal from said pressure transducer, said signal proportional to water pressure in said water lines;

displaying a digital readout of boat speed responsive to said electronic signal.

2. The method of claim 1 wherein the step of bleeding air occurs automatically when air is located in said water lines.

3. The method of claim 2 including the step of back lighting said digital readout for night time use.

4. A speedometer for use with water craft comprising:

a probe located adjacent to a bottom of said craft, said probe including a water line having a water inlet and a water outlet, said water inlet exposed to water pressure proportional to the speed of the craft through the water;

a bleed valve connected to said water outlet and for communicating water pressure to a pressure transducer;

said bleed valve allowing any air to escape from said bleed valve and water line automatically;

said pressure transducer generating a signal proportional to boat speed and supplying the signal to a speedometer readout.

5. The speedometer of claim 4 wherein, said probe includes a web attached to said first water line and a bracket mounted to said craft, said bracket including a pin pivotably mounting said first line and spring means resiliently biasing said first water line to a position where said water inlet faces a direction of movement of the boat through the water.

6. The speedometer of claim 4 wherein, said bleed valve includes a pipe extension having an inside diameter, a float located for movement within said inside diameter, said pipe extension including a seat near an extension outlet of said pipe extension said float having a first position wherein a portion of said float touches said seat to shut off flow from said extension outlet.

7. The speedometer of claim 4 wherein, said bleed valve includes a water inlet nipple, a water outlet nipple and an air bleed nipple, each of said nipples connected to a valve body;

a float located within said valve body, said float opening flow from said valve body to said air bleed nipple in response to air being located within said valve body.

8. A boat mounted speedometer system comprising:

a probe located adjacent to a bottom surface of said boat, said probe including a first water line having a water inlet and a water outlet, said water inlet exposed to water pressure proportional to the speed of the boat through the water;

a bleed valve connected through a second water line to said water outlet and for communication water pressure to a pressure transducer through a third water line;

said bleed valve allowing air trapped in the water in the water lines to bleed out through said bleed valve;

said pressure transducer generating a signal proportional to boat speed and supplying the signal to a speedometer readout.

9. The boat mounted speedometer of claim 1 wherein the speedometer readout is a back-lit digital display.

10. The boat mounted speedometer of claim 1 wherein said probe is flexibly mounted to said boat such that the probe can move relative to said boat.

11. The boat mounted speedometer of claim 1 wherein said bleed valve includes a water inlet and a float movable within said valve.

12. The boat mounted speedometer of claim 11 wherein said float has a specific gravity less than that of water and wherein said valve includes a valve seat.

* * * * *